(12) United States Patent
Hildebrand et al.

(10) Patent No.: US 12,467,494 B2
(45) Date of Patent: Nov. 11, 2025

(54) ASSEMBLY HAVING A BAYONET CLOSURE

(71) Applicant: Zumtobel Lighting GmbH, Lemgo (DE)

(72) Inventors: Benjamin Hildebrand, Lage (DE); Lennart Sulzbach, Detmold (DE)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 19/226,566

(22) Filed: Jun. 3, 2025

(65) Prior Publication Data

US 2025/0290533 A1 Sep. 18, 2025

Related U.S. Application Data

(63) Continuation of application No. PCT/EP2024/055809, filed on Mar. 6, 2024.

(51) Int. Cl.
*F16B 21/04* (2006.01)
*F21V 17/14* (2006.01)

(52) U.S. Cl.
CPC .............. *F16B 21/04* (2013.01); *F21V 17/14* (2013.01)

(58) Field of Classification Search
CPC ........ F21V 17/14; F21V 17/104; F21V 17/18; F16B 21/04; F16B 21/065; F16B 21/09; F16B 21/02
See application file for complete search history.

(56) References Cited

U.S. PATENT DOCUMENTS 5,465,199 A * 11/1995 Bray ..................... F21V 17/164
362/147
9,920,912 B1 3/2018 Zhang et al.
(Continued)

FOREIGN PATENT DOCUMENTS

DE 202021000598 U1 5/2021

*Primary Examiner* — Jong-Suk (James) Lee
*Assistant Examiner* — James M Endo
(74) *Attorney, Agent, or Firm* — S&F/WEHRW

(57) ABSTRACT

The present invention relates to an assembly (1) having: a component body (2), and a fastening body (3) for fastening the component body (2), wherein the component body (2) can be connected to the fastening body (3) via a bayonet closure (4) of the assembly (1), wherein the bayonet closure (4) has: a bayonet projection (5), and a bayonet groove (6) in and along which the bayonet projection (5) can be guided, wherein the bayonet groove (6) has: an introduction portion (60) via which the bayonet projection (5) can be introduced into the bayonet groove (6) in an introduction direction (E), a function portion (61) which extends away from the introduction portion (60) laterally in relation to the introduction direction (E) and opens at a distal end of said introduction portion in a locking portion (62) for fixing the bayonet projection (5), in which locking portion the bayonet projection (5) can be fixed in a locking position, a blocking portion (63) which connects the function portion (61) to the introduction portion (60), and a pocket portion (64) extending away from the function portion (61) counter to the introduction direction (E) between the blocking portion (63) and the locking portion (62), in which pocket portion the bayonet projection (5) can be at least partially received in a holding position, wherein the assembly (1) furthermore has a blocking element (7) which can be positioned selectively in a blocking position in the blocking portion (63) in order to block a passage for the bayonet projection (5) in the bayonet groove (6) between the introduction portion (60) and the (Continued)

Figure 1:
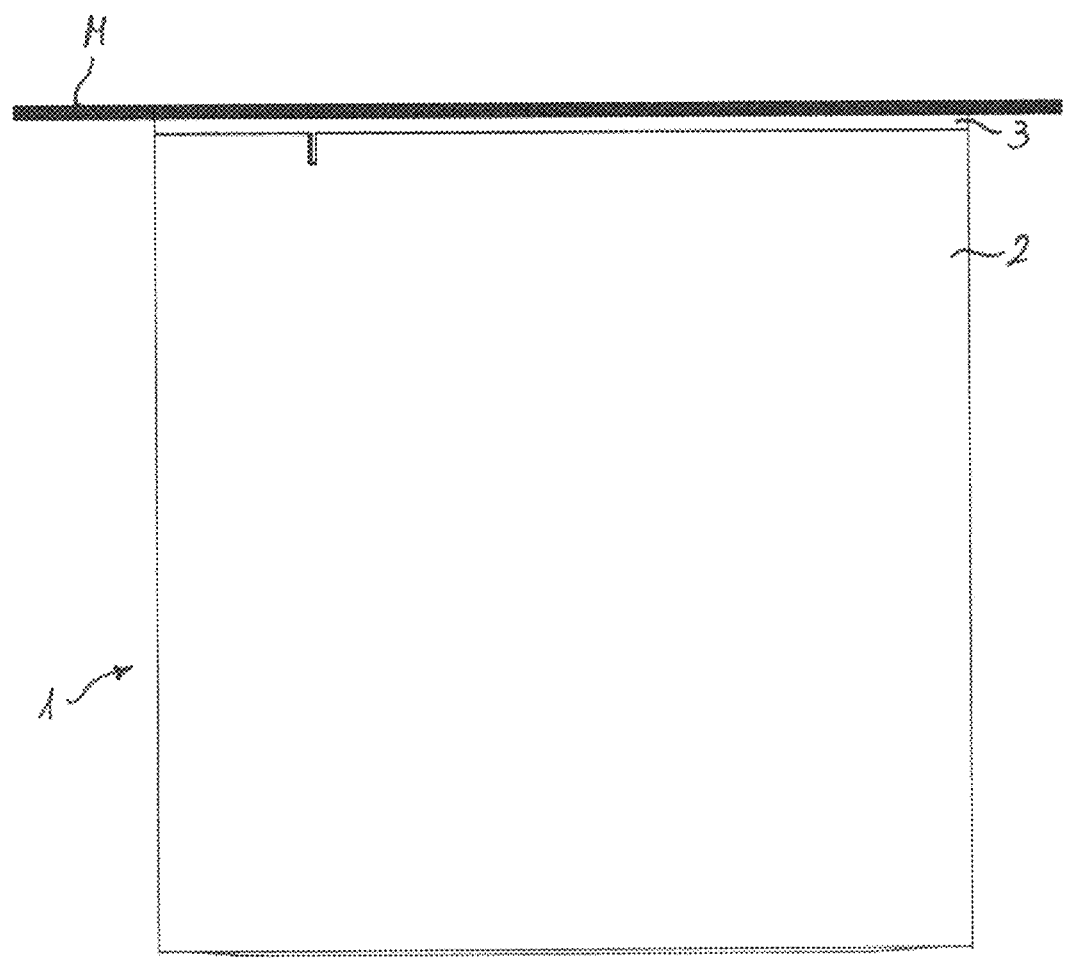

function portion (61), and wherein the assembly (1) is designed such that the blocking portion (63) is at least partially exposed in the holding position in such a manner in order to position the blocking element (7) in the blocking portion (63).

18 Claims, 13 Drawing Sheets

(56) References Cited

U.S. PATENT DOCUMENTS

| | | | |
|---|---|---|---|
| 10,808,922 B1* | 10/2020 | Hsu | F21V 33/0056 |
| 2006/0189218 A1* | 8/2006 | Uhari | G04B 37/1413 |
| | | | 439/752 |
| 2013/0083525 A1* | 4/2013 | Koo | F21K 9/00 |
| | | | 362/235 |
| 2016/0245250 A1* | 8/2016 | Noguchi | F02M 61/168 |
| 2017/0003028 A1* | 1/2017 | Pireyer | F23R 3/283 |
| 2019/0293267 A1* | 9/2019 | Marshal | F21V 23/0464 |
| 2022/0082220 A1 | 3/2022 | Wang et al. | |

* cited by examiner

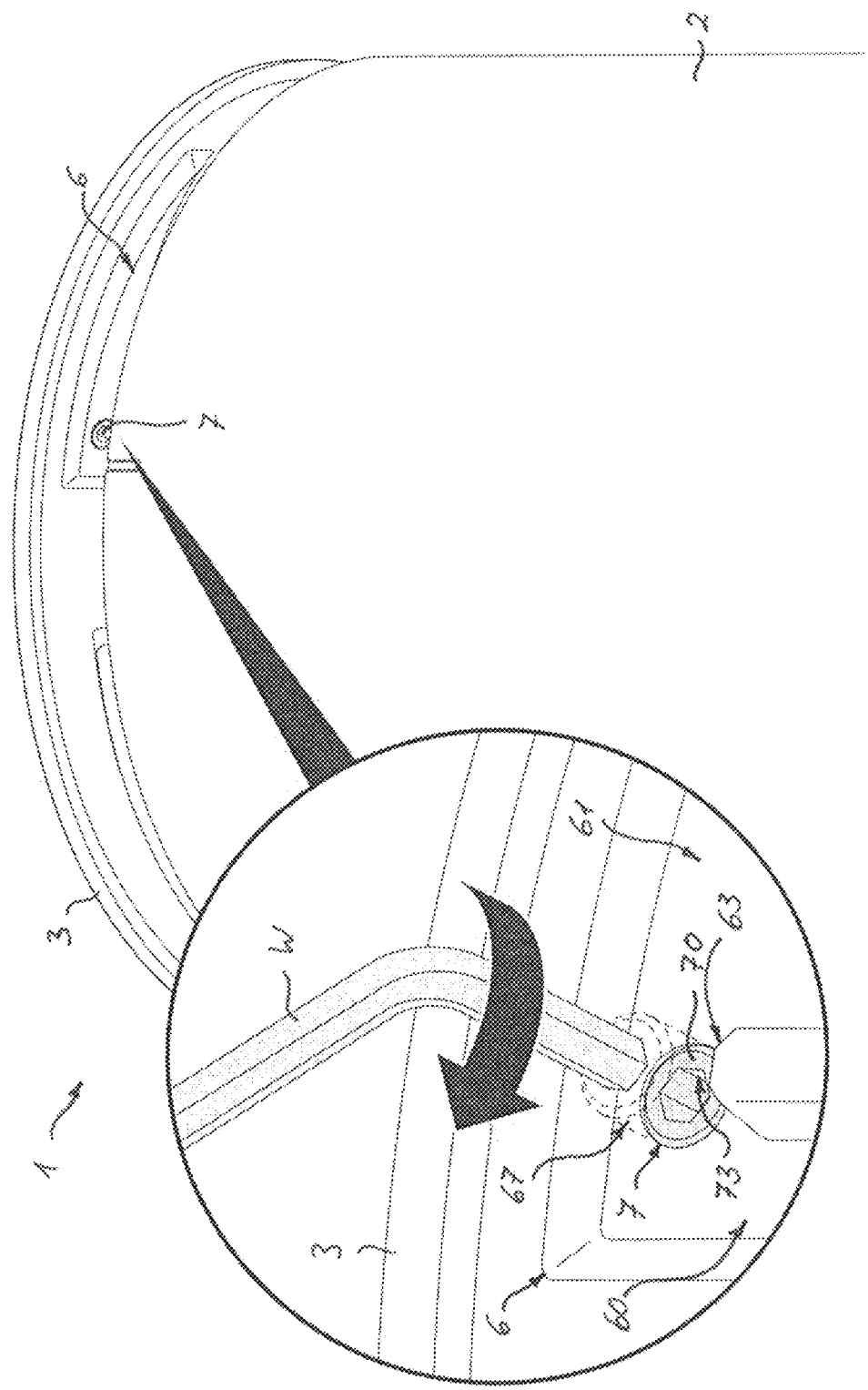

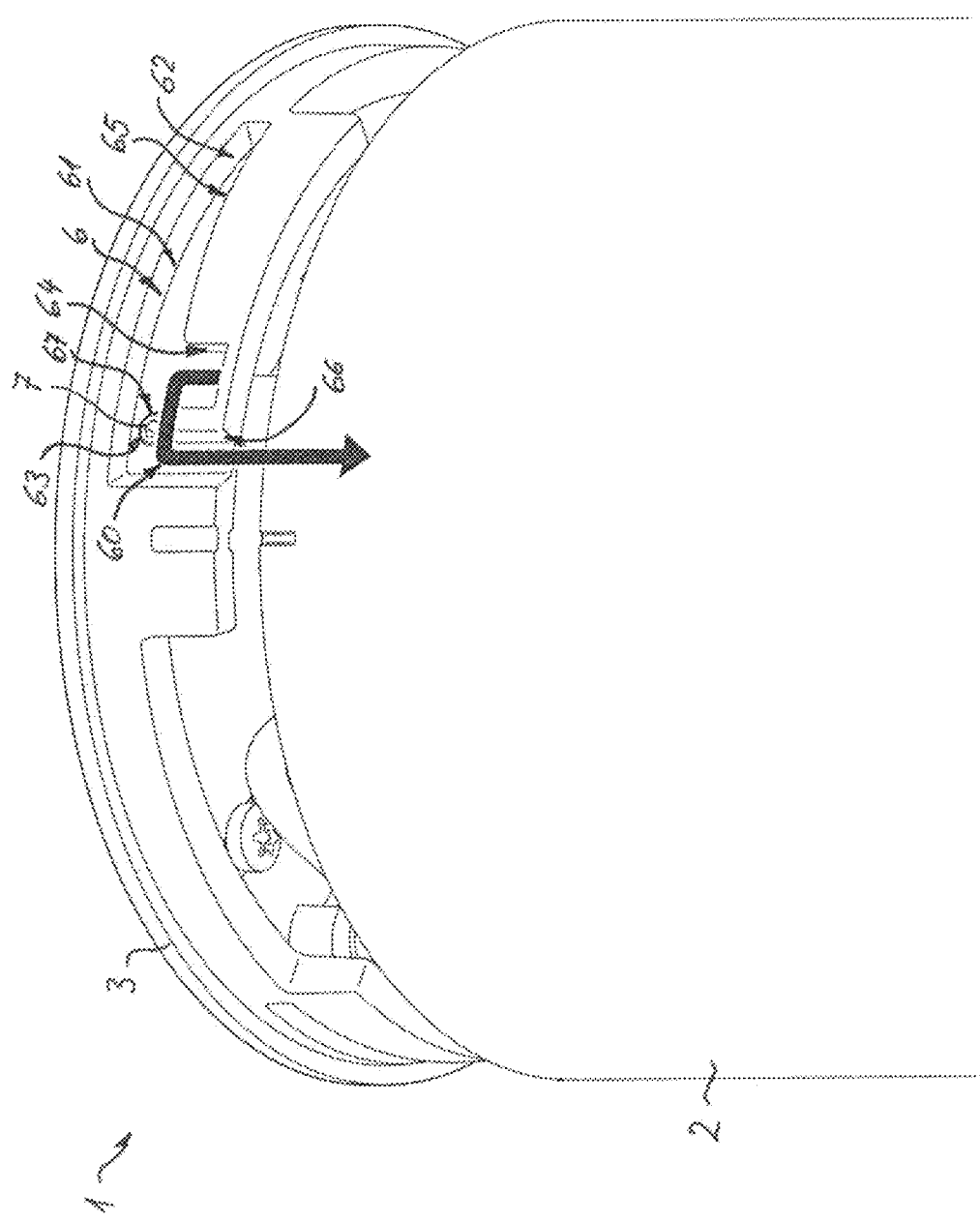

ASSEMBLY HAVING A BAYONET CLOSURE

CROSS-REFERENCE TO RELATED APPLICATIONS

This application is a continuation of International Application No. PCT/EP2024/055809, filed Mar. 6, 2024, which claims priority to Germany Patent Application No. 202023101645.6, filed Mar. 31, 2023, the disclosure of each of which is incorporated by reference herein in its entirety.

DESCRIPTION

The present invention relates to an assembly having a component body and a fastening body, which can be connected to one another via a bayonet closure.

Assemblies of the type mentioned at the outset are basically known from the prior art. These assemblies can, for example, be electrically operated assemblies, such as luminaires. In order to make it difficult or impossible to loosen or remove, especially by hand, the component body from the fastening body when it is in the closed or connected operating state, various securing options are known. For example, cords can be provided to hold the component body to the fastening body even when the bayonet closure is released. Also known are bayonet closures with a simple safety catch which, however, is comparatively easy to overcome. Simple spring locks can also be installed to prevent the component body from coming loose from the fastening body, for example, by holding the bayonet projection in the bayonet groove so as to be preloaded toward a locking position. These known securing mechanisms are either visible and thus not very aesthetically pleasing, or they are comparatively complex and expensive to implement, or they can be easily overcome and are therefore suitable as a securing device only to a limited extent.

It is therefore an object of the present invention to provide an assembly of the type mentioned at the outset, which has a simple but effective and preferably aesthetically pleasing securing mechanism.

This object is achieved by the subject-matter of the independent claim. The dependent claims develop the central idea of the present invention in a particularly advantageous manner.

According to a first aspect, the present invention relates to an assembly having a component body and a fastening body for fastening the component body. The component body can be connected to the fastening body via a bayonet closure of the assembly. The bayonet closure has a bayonet projection (for example on the component body side) and a bayonet groove (for example on the fastening body side) in and along which the bayonet projection can be guided. The bayonet groove has an introduction portion via which the bayonet projection can be introduced into the bayonet groove in an introduction direction. The bayonet groove also has a function portion which extends laterally with respect to the introduction direction away from the introduction portion and opens at a distal end thereof in a locking portion for securing the bayonet projection, in which the bayonet projection can be secured in a locking position. The bayonet groove further comprises a blocking portion which connects the function portion with the introduction portion. The blocking portion can preferably be arranged downstream of the introduction portion in the introduction direction and/or branching off laterally from the introduction portion with respect to the introduction direction toward the function portion. The bayonet groove further comprises a pocket portion extending between the blocking portion and the locking portion away from the function portion in the opposite direction to the introduction direction, in which the bayonet projection can be at least partially received in a holding position. The assembly further comprises a blocking element which can be selectively positioned in a blocking position in the blocking portion, in order to block a passage for the bayonet projection in the bayonet groove between the introduction portion and the function portion. The assembly (for example the component body) is designed such that the blocking portion is at least partially exposed in the holding position in such a way as to position the blocking element in the blocking portion.

By means of the above-described design of the assembly, a pocket portion is thus provided in the bayonet groove, which makes it possible for the component body and the fastening body to be displaced relative to one another with respect to the introduction direction by the insertion of the bayonet projection into said pocket portion into the holding position in such a way that the blocking portion is correspondingly exposed for positioning the blocking element therein. By the bayonet projection being accommodated in the pocket portion, the component body and the fastening body can be secured in a safe and preferably engaged position (holding position), which facilitates handling for an installer. In this position, as a result of the defined exposure of the blocking portion, a securing device can then be provided in the bayonet groove by means of which a release of the bayonet projection from the bayonet groove can be blocked and thus a separation of the bayonet closure can be prevented. The bayonet closure can then be closed or secured by moving the bayonet projection into and fixing it in the locking position. For release, the bayonet projection can then simply be moved from the locking position into the holding position, which in turn correspondingly exposes the blocking portion. The blocking effect can then be released by removing the blocking element from the blocking portion or from the blocking position; due to the holding position, this can preferably be done in a way that is easy for the installer. The bayonet projection can then be guided over the exposed blocking portion into the introduction portion and then out of the bayonet groove in order to disassemble the assembly. This provides a simple but effective way to secure a corresponding assembly. The pocket portion preferably acts as a drop pocket, which simultaneously secures the component body and the fastening body relative to each other and makes the blocking portion accessible for positioning or removing the blocking element in or from the blocking position. The simple design permits a comparatively inexpensive but secure bayonet closure. In addition, assembly and disassembly is simple, safe and convenient.

The component body preferably has the bayonet projection, and the fastening body preferably has the bayonet groove. In this way, a preferred embodiment of the assembly can be provided in which the component body, which often determines the aesthetic appearance, includes the less conspicuous part of the bayonet closure, namely the bayonet projection. This also makes it possible to conceal the bayonet closure more effectively. In principle, the fastening body can also include the bayonet projection and the component body can include the bayonet groove.

The blocking element can be provided (for example on the fastening body) in such a way that in the holding position it can be moved selectively between the blocking position and a release position in which the blocking element releases the passage for the bayonet projection in the bayonet groove between the introduction portion and the function portion.

Due to the defined mobility of the blocking element in the assembly, the blocking element can remain in the assembly. On the one hand, this simplifies the assembly of the components using the bayonet closure. On the other hand, the blocking element can preferably be provided in a captive manner. In principle, however, it is also conceivable for the blocking element to be removed or taken off to expose the passage and to be fastened correspondingly in the blocking portion for positioning.

The blocking element preferably has or is a screw. A simple means can thus be provided as a blocking element which is both easy and intuitive to use. A screw is also easy to provide; for example, a standard element can preferably be used. Moreover, a receptacle for the blocking element can be provided, for example, in the form of a simple internal thread (e.g. as a threaded hole). According to a particularly preferred embodiment, the blocking element is or has a threaded pin. A particularly simple and readily available component can thus be used as a blocking element.

The screw is preferably designed and provided such as to be moved between the blocking position and the release position by a screwing movement of the screw. This makes it particularly easy to provide and operate a corresponding blocking element. Moreover, fastening by means of a bayonet closure can thus be preferably provided, which can also meet high safety requirements (as prescribed in DIN EN IEC 60598, for example). For example, it is often stipulated that to avoid electric shock covers or housings in particular must not be loosened or removed by hand.

The blocking element can preferably have a screw engagement profile (for example a slot, a cruciform recess, a hexagon socket, a hexalobular socket, etc.) for screwing the blocking element into a corresponding thread in a simple manner and using common tools or to move it between the blocking position and the release position.

The blocking element preferably has a pressure piece with a movable pressure part, wherein the pressure part is preloaded into the blocking position by a compression spring in order to block the passage for the bayonet projection in the bayonet groove between the introduction portion and the function portion. A common and readily available component is thus provided as a blocking element. The pressure piece preferably comprises a sleeve, the compression spring and the pressure part. The pressure part is received in the sleeve so as to be longitudinally movable between a bottom (so that the pressure part is preferably (substantially) completely received in the sleeve) and an opposite opening (so that the pressure piece partially protrudes from the sleeve beyond the opening) of the sleeve. The compression spring is arranged between the pressure part and the bottom in order to preload the pressure part toward the opening. The sleeve has a stop for the pressure piece in the region of the opening in order to hold the pressure piece securely in the sleeve. The sleeve can be provided as a separate component or can be provided integrally in the assembly (e.g. component body or fastening body). The compression spring is preferably made of stainless steel. The pressure part preferably has a ball, which is made, for example, of stainless steel or polyoxymethylene (POM). For example, the pressure piece—e.g. its sleeve—can have an external thread (and thus a screw) in order to be accommodated in the assembly and to position the pressure part in the blocking position. It is also conceivable for the pressure piece to be held in the assembly in a force-fitting manner (e.g. by self-clamping) in order to position the pressure part (initially) in the blocking position; for this purpose, the sleeve is preferably made of a plastic (preferably a thermoplastic) and can thus be easily introduced or pressed into a corresponding recess in the assembly.

The pressure piece is preferably designed and provided such that the pressure part can be selectively transferred from the blocking position to the release position against the preload of the compression spring, for example moved into the sleeve away from the opening toward the bottom of the sleeve. In this way, the component body and the fastening body can be easily connected, while the preload of the pressure piece provides good security for the bayonet closure. Since the pressure piece is preloaded toward the blocking position, it automatically pushes back into it and thus enables a secure blocking of the bayonet projection in the aforementioned passage of the bayonet groove.

The component body preferably at least partially or completely accommodates the fastening body in the locking position. A generally functional fastening component, such as the fastening body, can thus be effectively concealed by an as a rule functionally aesthetic component, such as the component body. In addition, this makes a compact design possible.

The assembly is preferably designed such that the bayonet groove is completely covered in the locking position, preferably by the component body. The bayonet closure is thus concealed in the locking position in a simple and effective manner, while at the same time an effective accessibility is provided for securing the bayonet closure via the blocking element.

The blocking portion preferably branches off from an end of the introduction portion that is distal in relation to the introduction direction, preferably downstream in the introduction direction or laterally to the introduction direction. Preferably, the blocking portion branches off from an end of the introduction portion opposite an introduction opening (for the bayonet projection into the bayonet groove). An overall simple structure of the bayonet groove is thus provided, which is therefore easy to manufacture and can also be operated intuitively.

The function portion preferably tapers toward the locking portion. In this way, a simple but effective connection is provided by means of the bayonet closure.

The function portion preferably comprises a run-on slope pointing in the introduction direction and inclined toward the locking portion in the introduction direction. This run-on slope makes possible an intuitive and simple connection of the bayonet closure when the bayonet projection is moved into the locking position, thus when the bayonet projection is introduced into the locking portion of the bayonet groove.

The component body and the fastening body preferably each have contact faces directed toward one another with respect to the introduction direction, wherein the bayonet closure is designed such that the contact faces are pressed against one another in the locking position, preferably by supporting the bayonet projection against the locking portion or the run-on slope. In this way, a large-area connection surface can be provided between the component body and the fastening body in order to ensure an effective connection of these components in the locking position. The run-on slope can preferably be used to easily press the contact faces against each other in the locking position; it can thus serve as a support for the bayonet projection.

The run-on slope can thus either serve as a support for pressing the contact faces against each other and/or provide the previously described tapering of the locking portion in a simple manner.

In a preferred embodiment, a preferably circumferentially closed seal can be provided between the two contact faces in order to seal the assembly in this connection area according to a desired IP protection class.

The bayonet projection can preferably have a round or square cross-section as seen in its projection direction. The bayonet projection can preferably be designed as a pin or as a block. Overall, the bayonet projection can thus be provided in a simple but effective manner.

The assembly can preferably comprise a plurality of the bayonet closures, which are preferably provided so as to be symmetrically or evenly distributed. In this way, the effect of the connection via the bayonet closure can be increased correspondingly and the connection can be made particularly secure overall. In this way, the load of the connection can also be evenly distributed across the corresponding bayonet closures. The assembly can then have corresponding blocking elements for at least one, several or all of the bayonet closures. A corresponding blocking element can then be positioned in the blocking position in at least one, several or all of the blocking portions.

The assembly preferably has a square and preferably a quadrangular basic shape or contour when viewed in the introduction direction. Alternatively, it is conceivable for the assembly to have a round and preferably a circular basic shape or contour when viewed in the introduction direction. In principle, the assembly can have any basic shape or contour when viewed in the introduction direction. The two aforementioned (square and round) basic shapes generally represent the most common and aesthetically pleasing basic shapes or contours of corresponding assemblies.

The assembly can preferably have at least one of the bayonet closures on two opposite sides. In this way, an even distribution of the connection effect can be achieved, in particular in the case of square assemblies but also in the case of differently shaped assemblies, such as round assemblies. In the case of square assemblies, the opposing bayonet closures can be preferably introduced into the locking position by means of a translational relative movement between the component body and the fastening body. In the case of round assemblies, the opposing bayonet closures can be preferably introduced into the locking position by means of a rotational relative movement between the component body and the fastening body.

The assembly preferably comprises a plurality of bayonet closures distributed along a circle and preferably evenly over this circle. Such a distribution is advantageous in particular for round or circular assemblies in which the bayonet closure is closed by a rotational movement of the component body and fastening body relative to each other about a generally central axis of rotation.

The fastening body can preferably have mounting structures in order to fasten the component body connected thereto to a mounting surface via the bayonet closure. In this respect, a simple but effective fastening option for the fastening body to a mounting surface can be provided. The mounting structures can, for example, in their simplest form, be through-openings through which fastening means, such as screws, can be passed to secure the fastening body. In addition, other fastening structures, such as threads, locking structures and the like, are also conceivable.

According to a particularly preferred embodiment, the assembly can be a luminaire, wherein, in that case, the component body preferably has or is a luminaire housing. The luminaire can be, for example, a recessed luminaire, a surface-mounted luminaire or even a pendant luminaire.

The luminaire housing can preferably have a light source, in particular for emitting light from the luminaire or for illumination by the luminaire. The light source can preferably comprise an LED or an LED module. This makes it easy to provide a luminaire as a corresponding assembly.

The luminaire housing preferably accommodates at least part of a luminaire electrical system and/or luminaire electronic system for operating the luminaire, namely at least part of the luminaire operating elements. A corresponding luminaire can thus be provided in an effective manner.

In principle, it is conceivable for the assembly to also represent any other possible and preferably electrically operated assembly, such as a sensor, a camera, a loudspeaker, and the like. The component body can then preferably have or be a corresponding assembly housing. At least some of the assembly operating elements (e.g. at least some of the assembly electrical system and/or assembly electronic system) for operating the assembly can then preferably be accommodated in such an assembly housing.

Furthermore, the fastening body can also carry or accommodate at least some of the assembly operating elements (e.g. assembly electrical system and/or assembly electronic system) or of the luminaire operating elements (e.g. luminaire electrical system and/or luminaire electronic system) for operating the luminaire.

Figure 2:
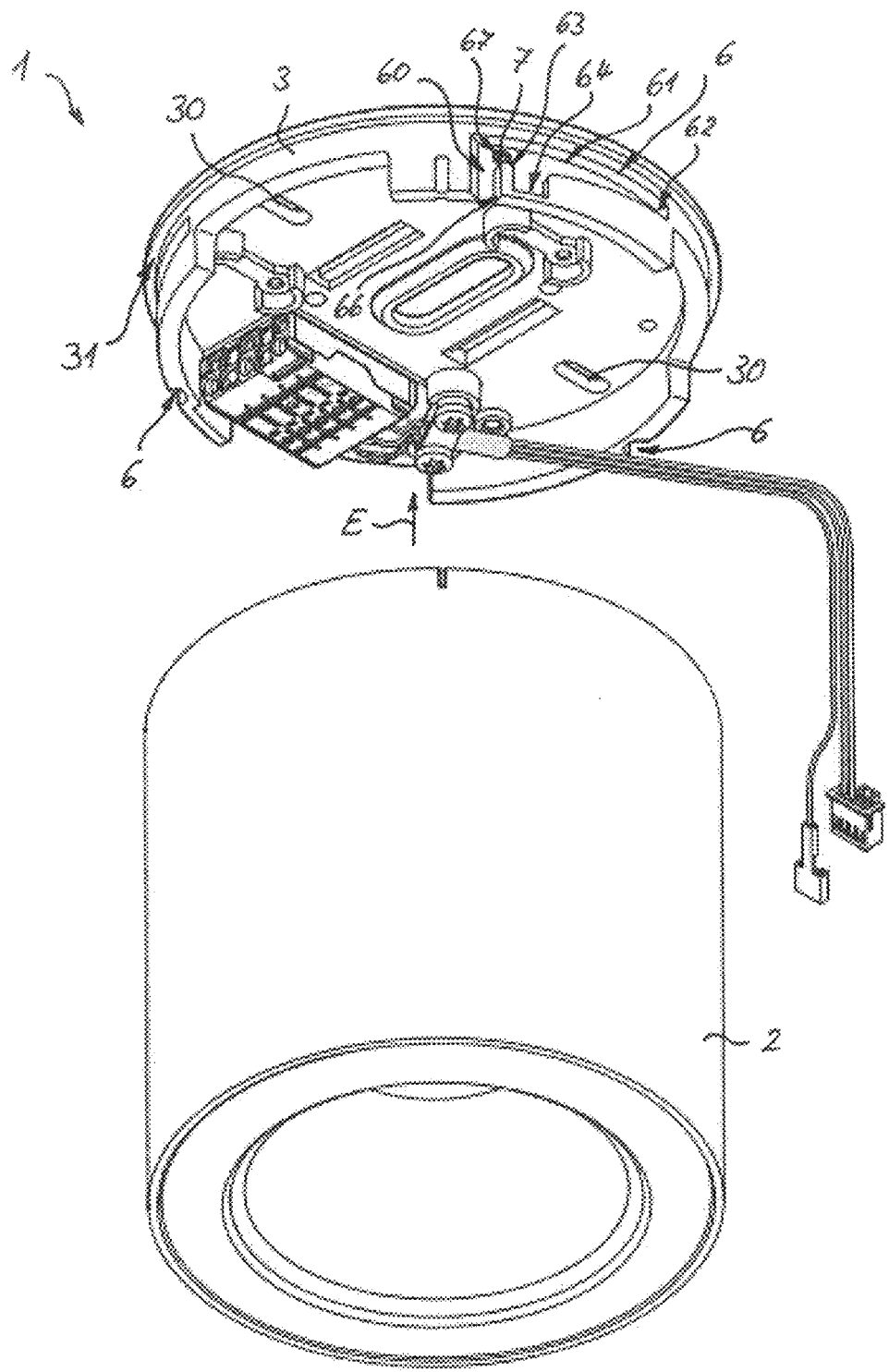
Figure 3:
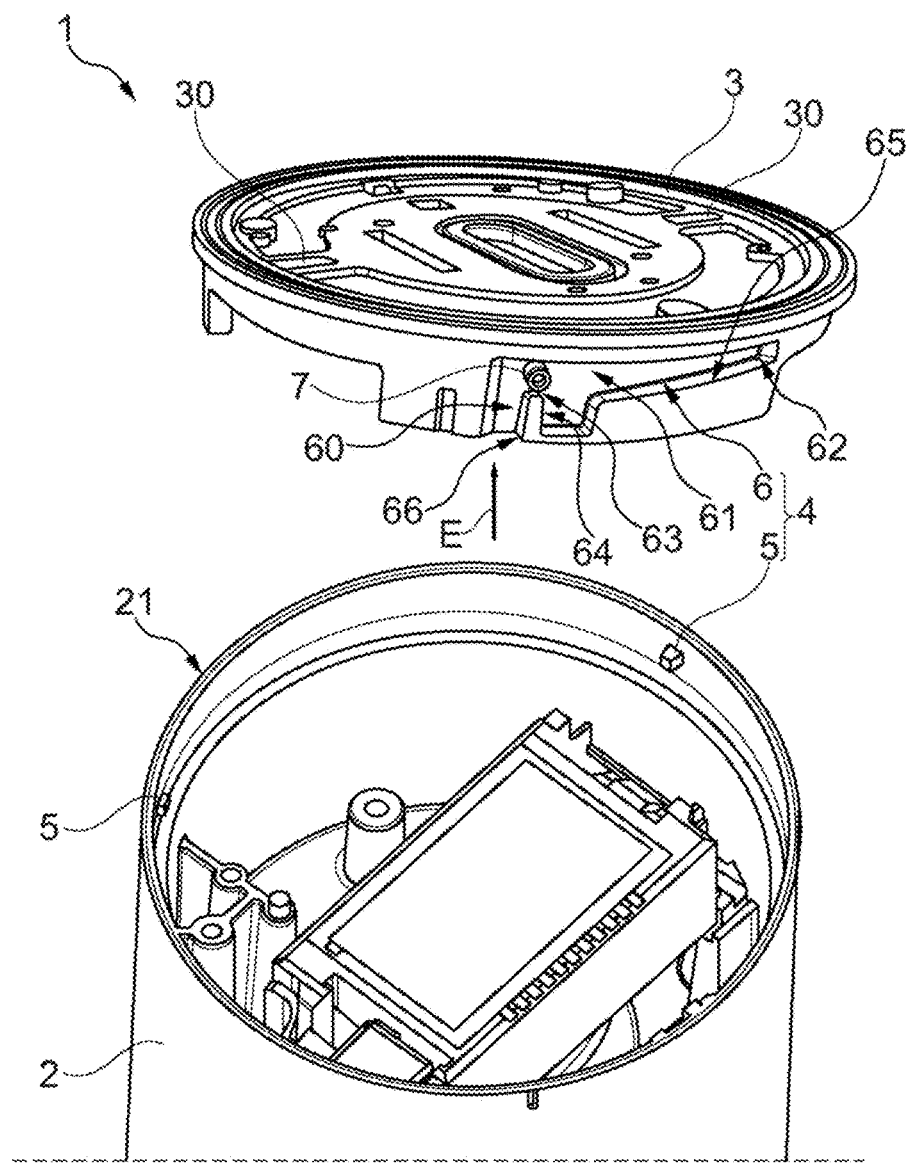
Figure 4:
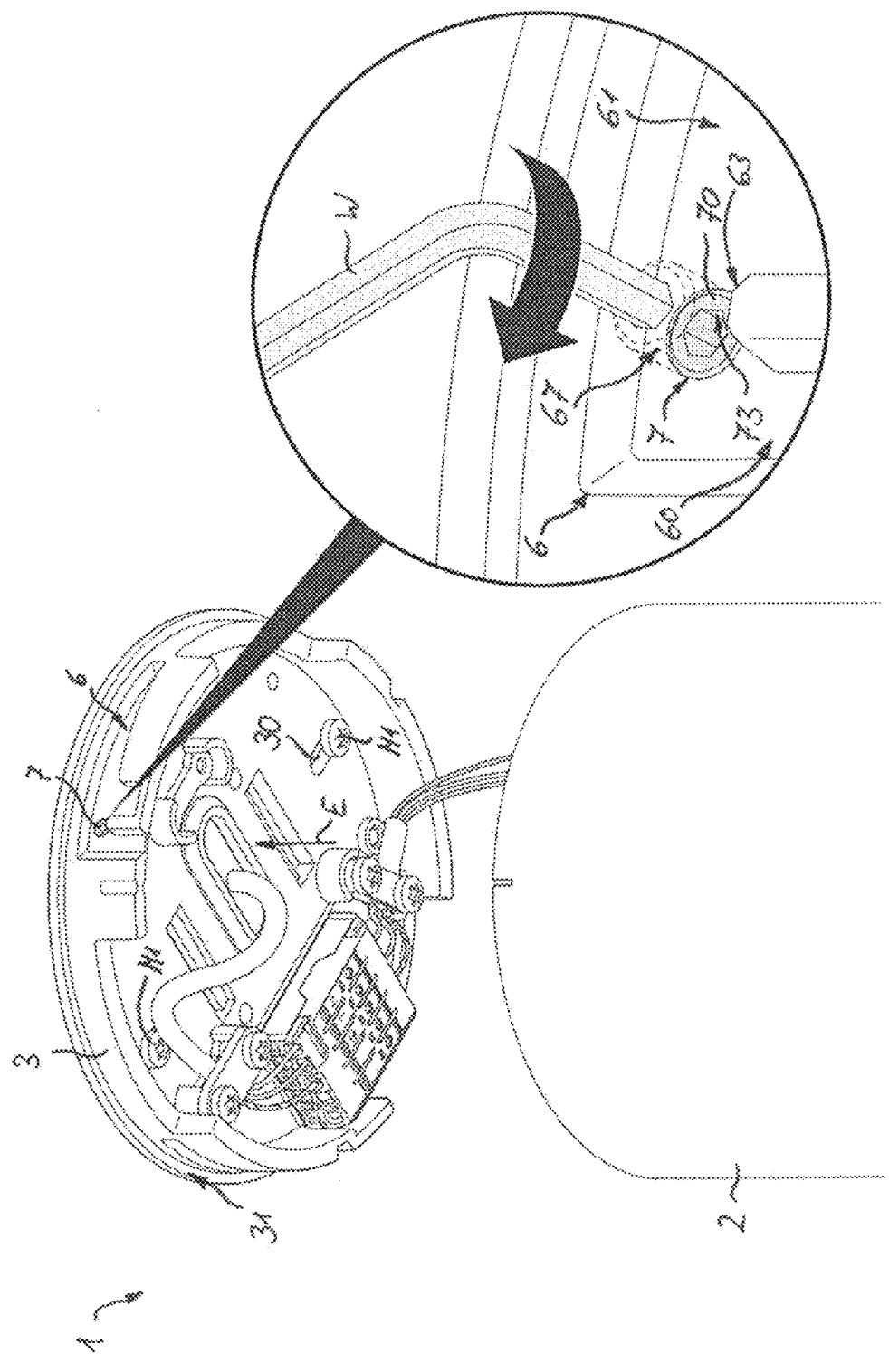
Figure 5:
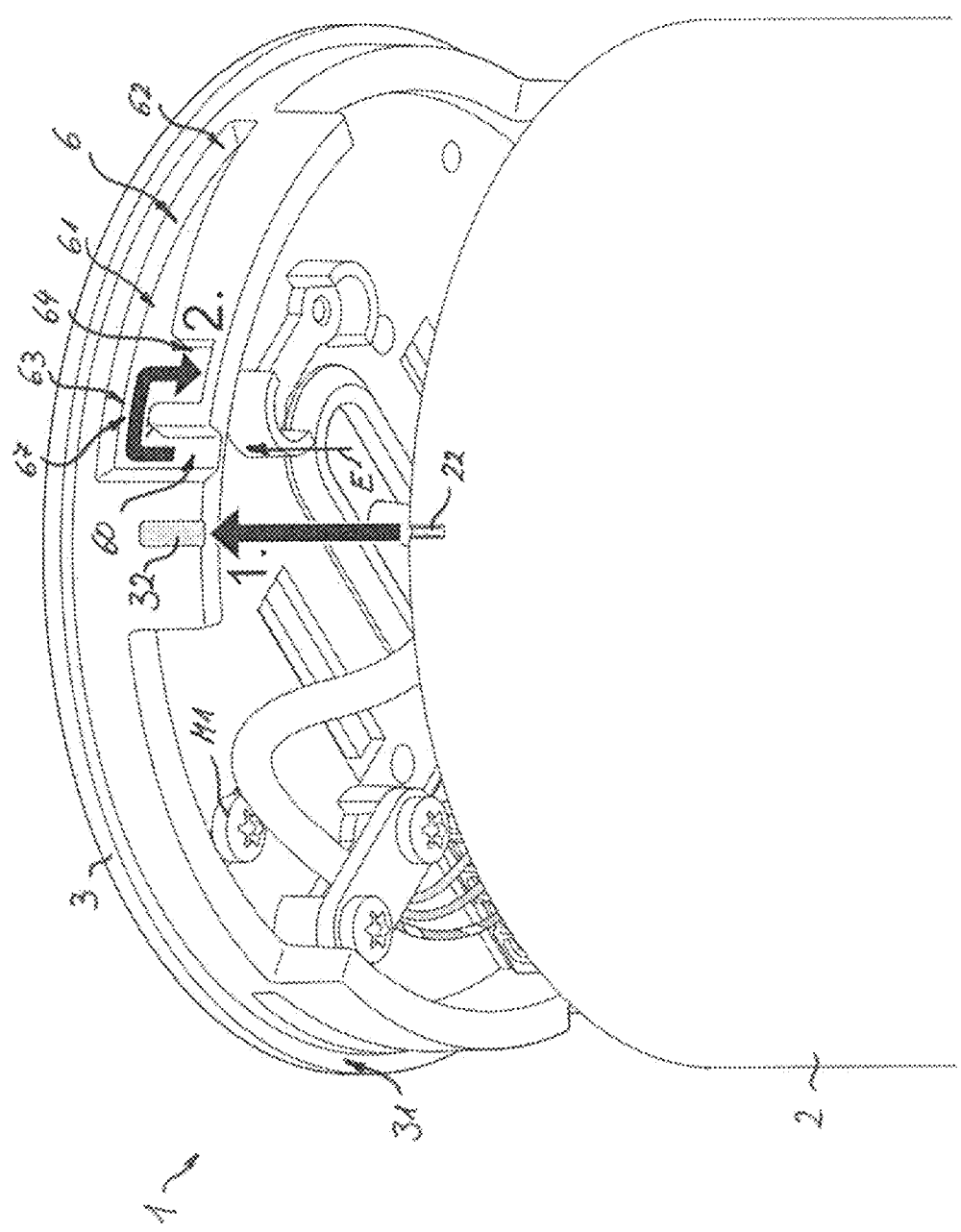
Figure 6:
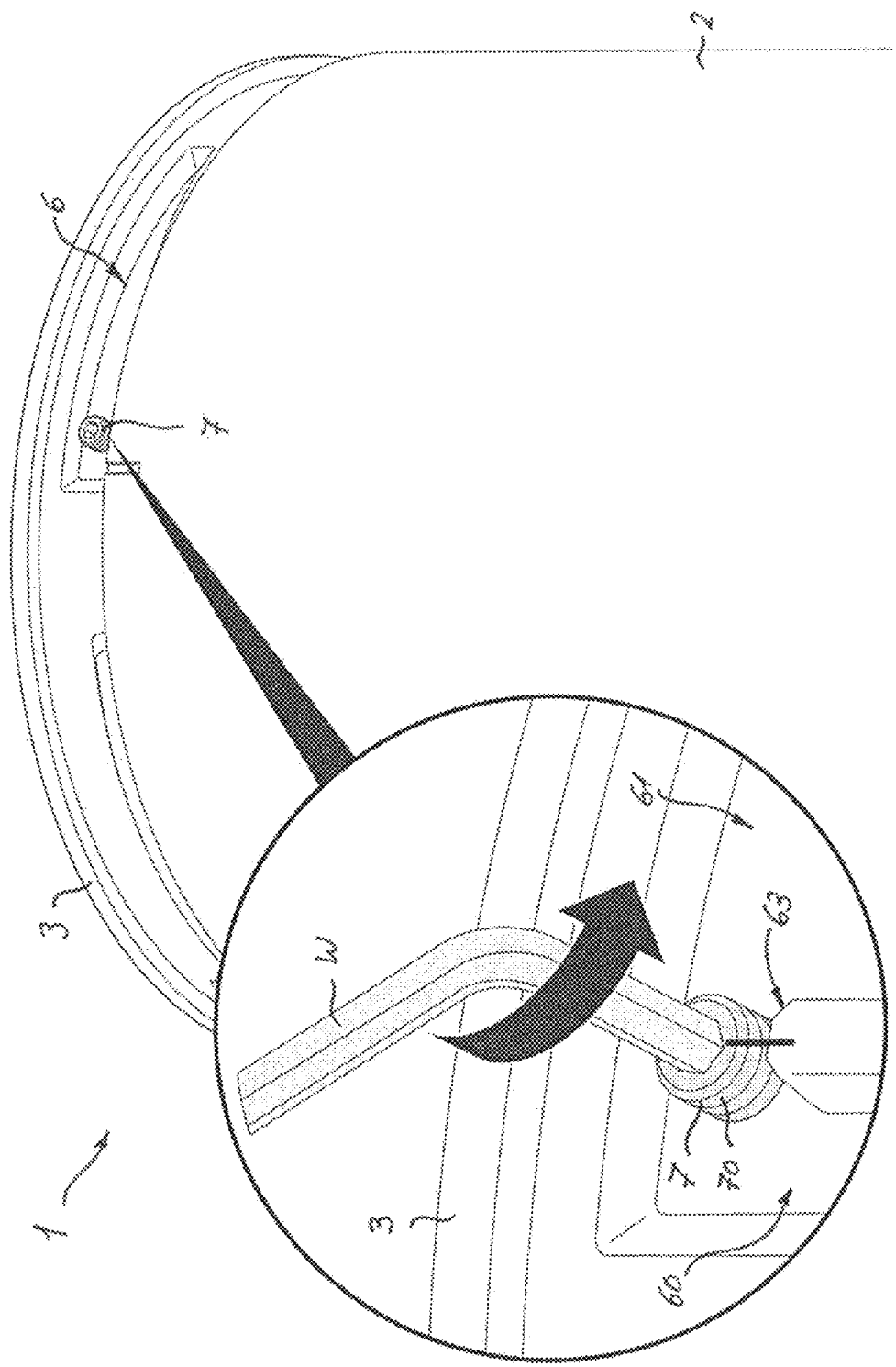
Figure 7:
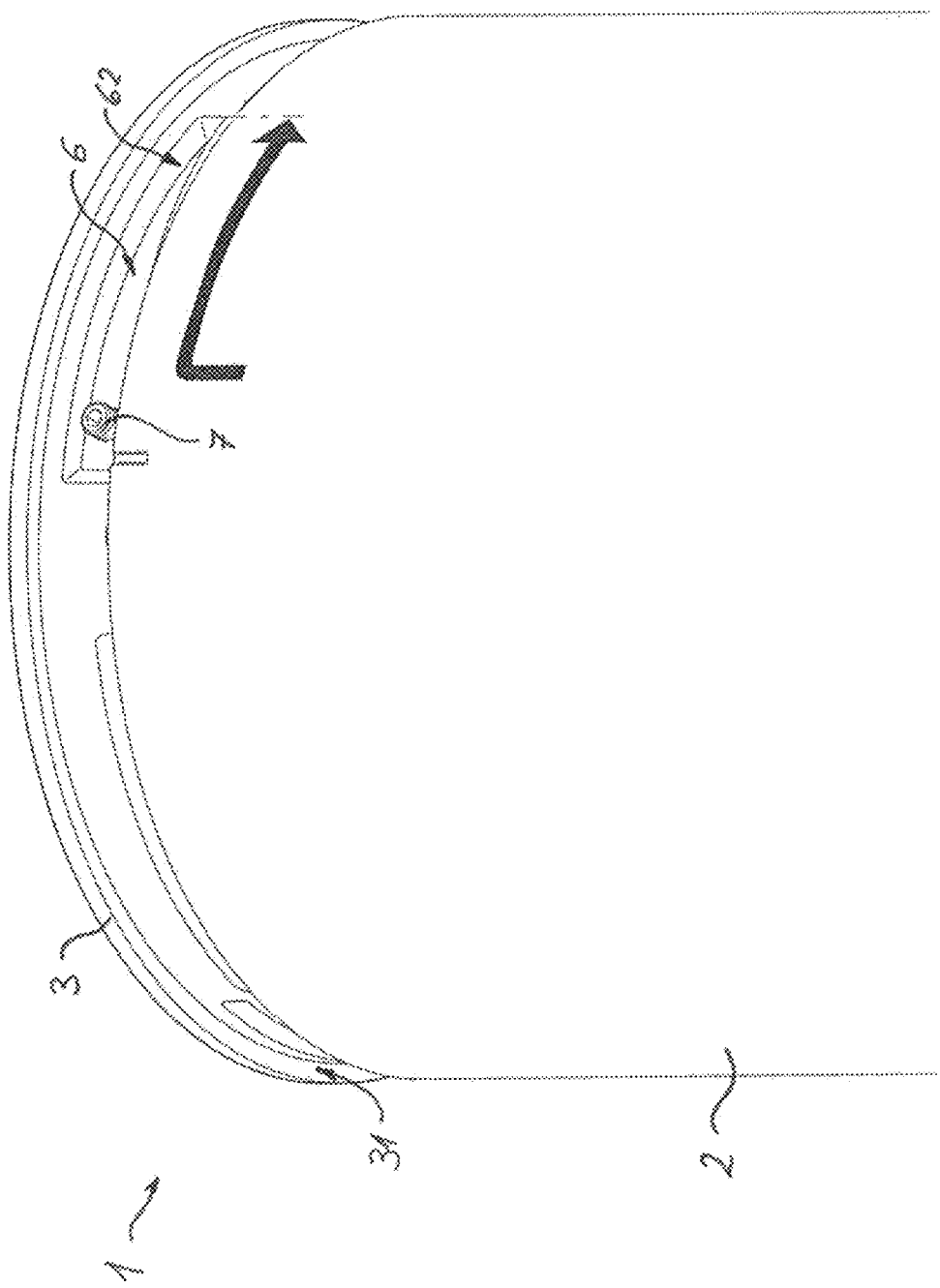
Figure 8:
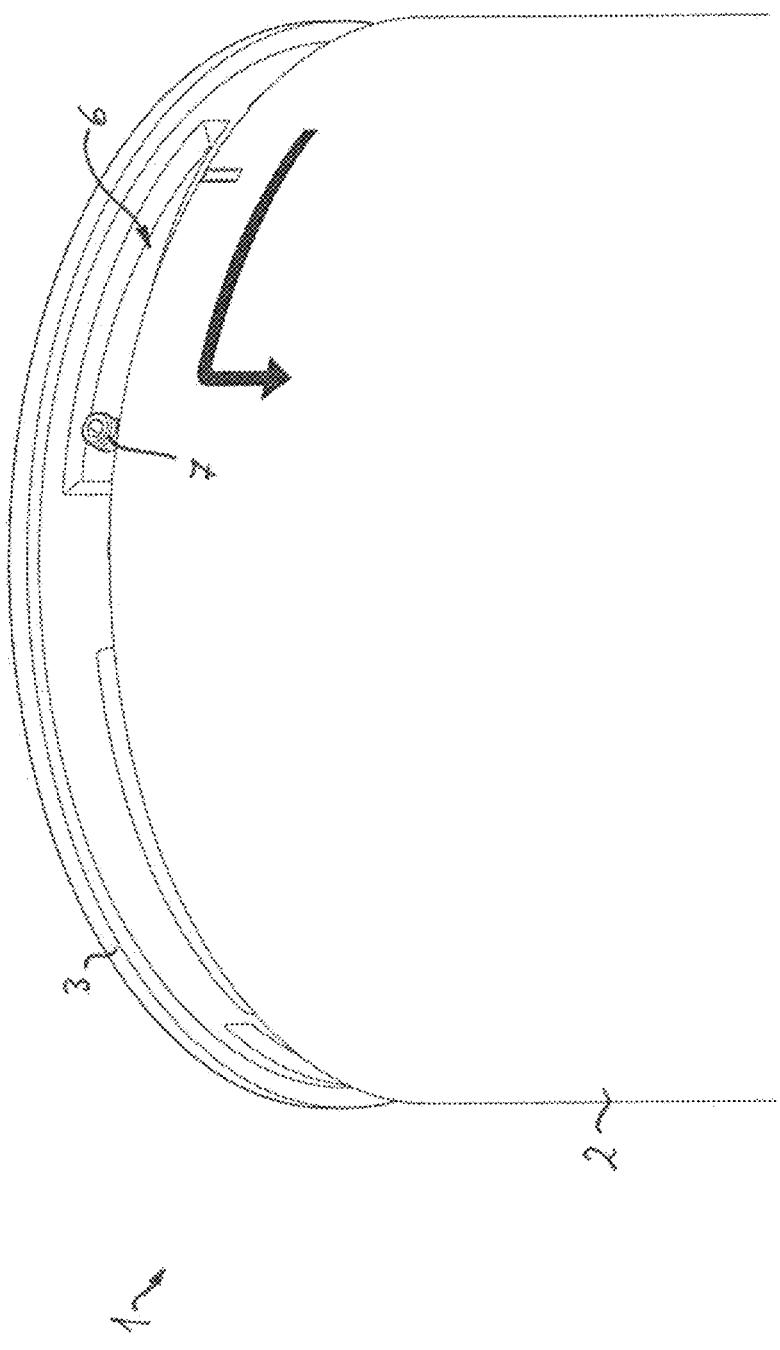
Figure 11A:
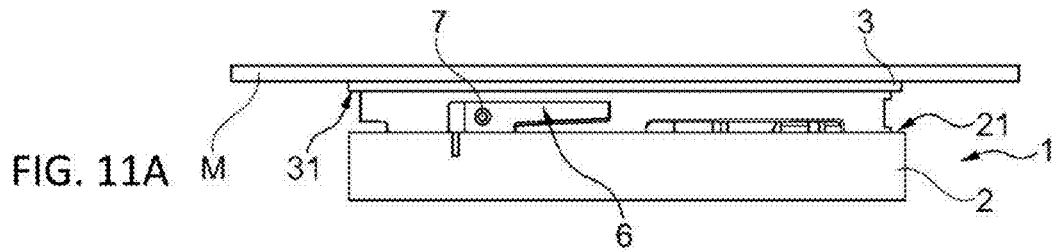
Figure 11B:
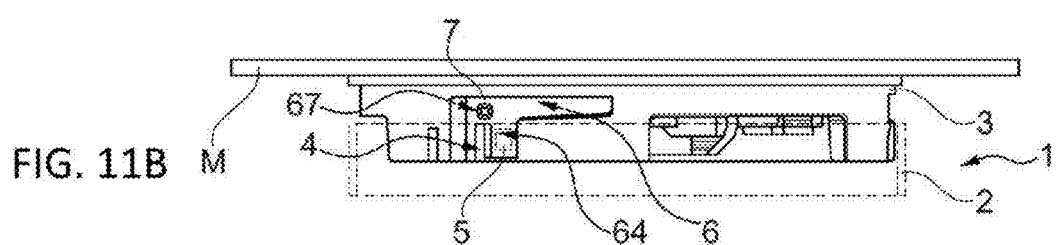
Figure 11C:
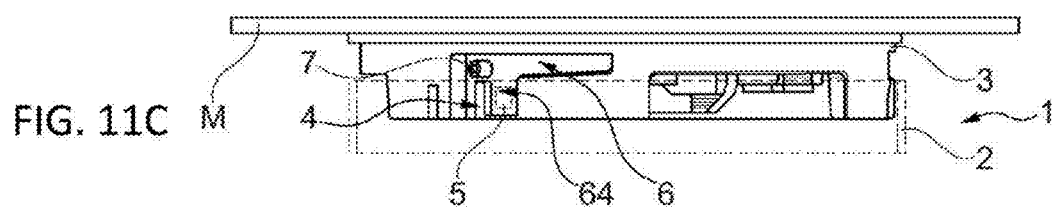
Figure 11D:
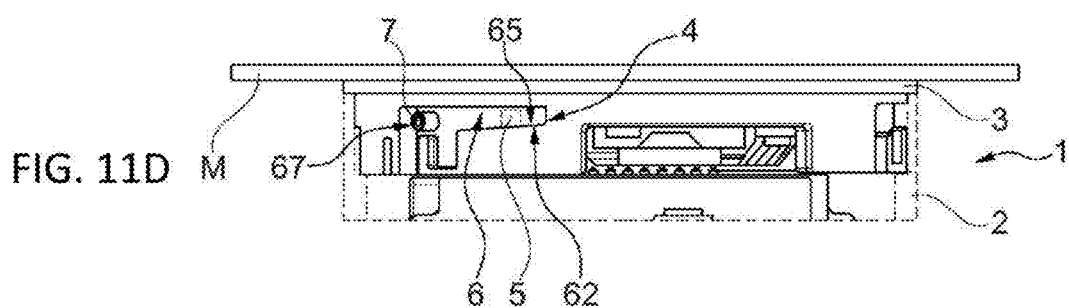
Figure 12:
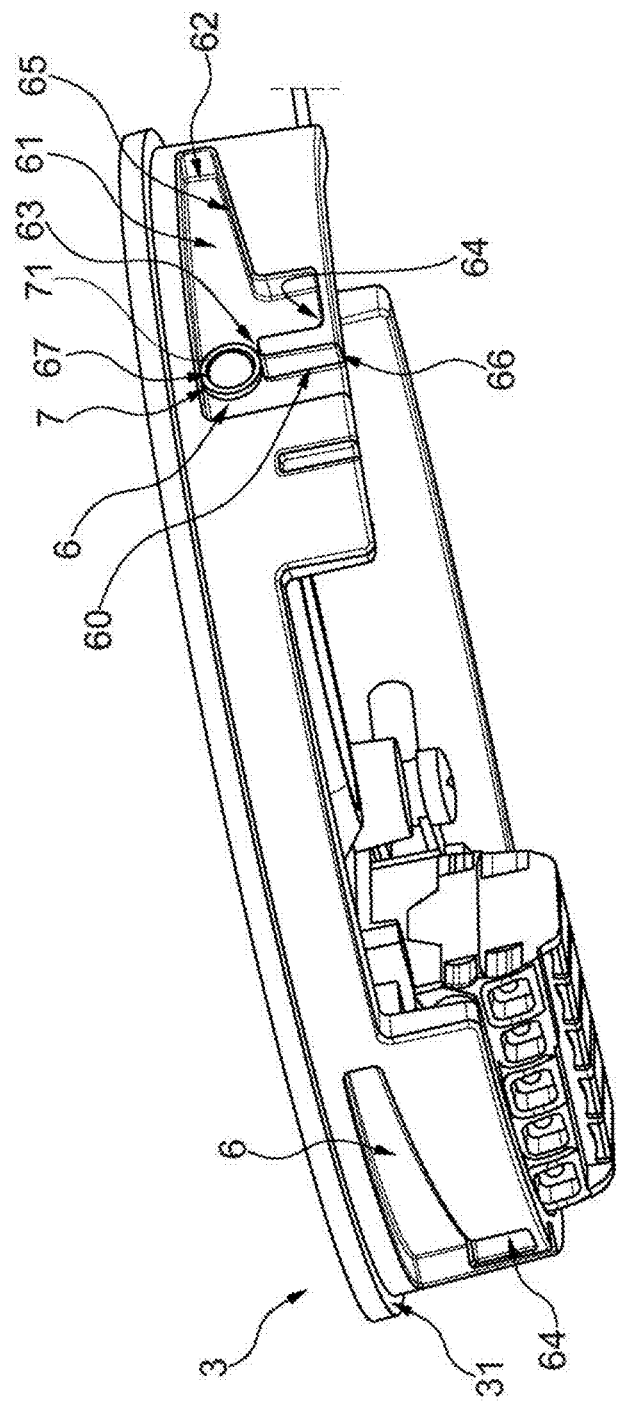
Figure 13:
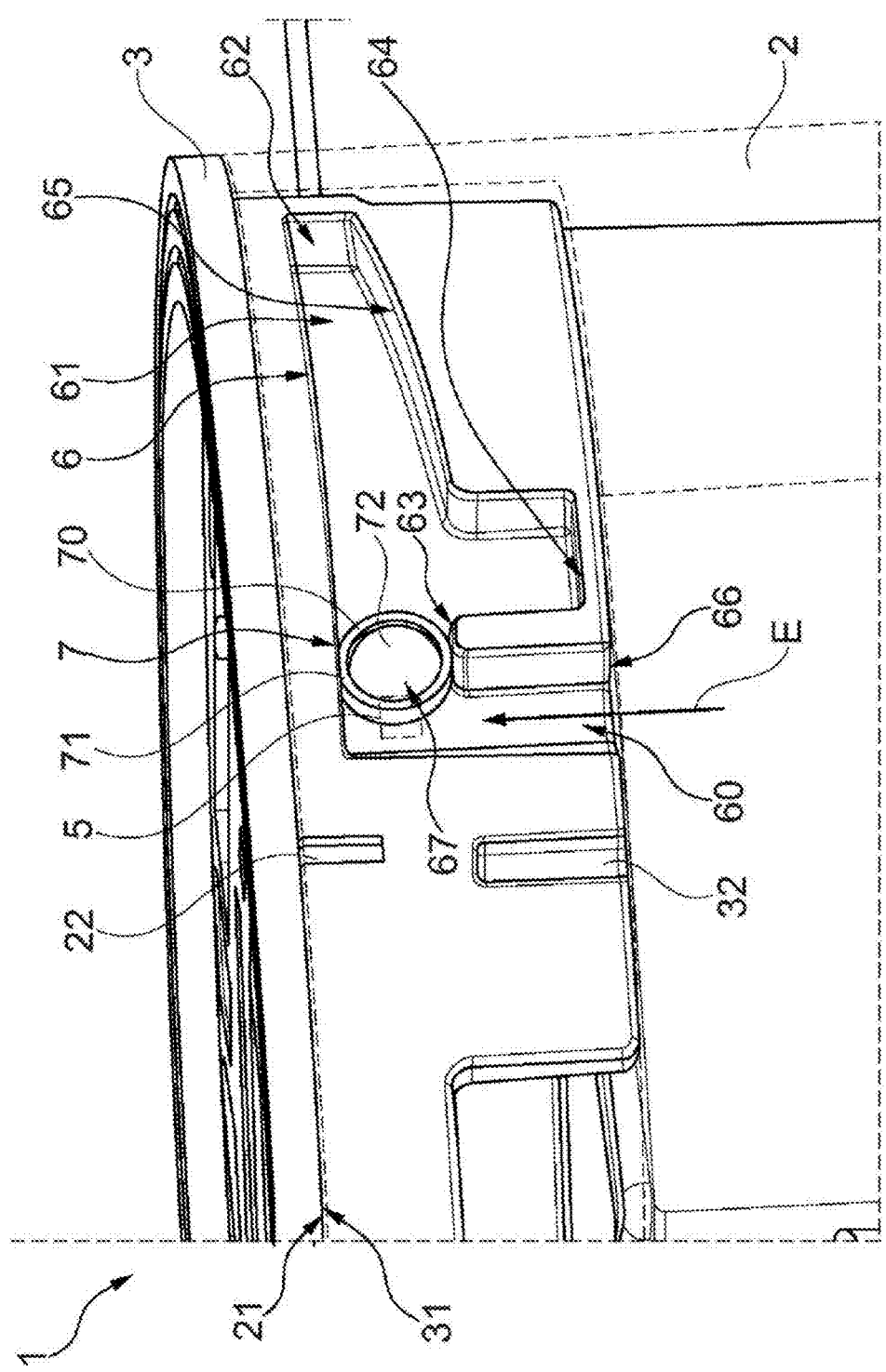

Further embodiments and advantages of the present invention are now described with reference to the figures of the accompanying drawings. In the drawings:

FIG. 1 shows a side view of an assembly (luminaire) according to the invention in an assembled state, FIG. 2 shows a perspective view of the assembly according to FIG. 1 in the separated state, FIG. 3 shows a perspective view of the assembly according to FIG. 2, FIG. 4 shows a perspective view and a detailed view of the assembly according to FIG. 2 in a first assembly step, FIG. 5 shows a perspective view of the assembly according to FIG. 4 in a second assembly step, FIG. 6 shows a perspective view and a detailed view of the assembly according to FIG. 5 in a third assembly step, FIG. 7 shows a perspective view of the assembly according to FIG. 6 in a fourth assembly step for achieving the assembled state according to FIG. 1, FIG. 8 shows a perspective view of the assembly according to FIG. 1 in a first disassembly step, FIG. 9 shows a perspective view and a detailed view of the assembly according to FIG. 8 in a second disassembly step, FIG. 10 shows a perspective view of the assembly according to FIG. 9 in a third disassembly step for achieving the disassembled state according to FIG. 2, FIG. 11 shows a partial side view of the assembly according to FIG. 1 after completion of the second assembly step according to FIG. 5 (FIG. 11A), with a partially transparent component body in order to illustrate the bayonet closure (FIG. 11B), at the end of the third assembly step according to FIG. 6 (FIG. 11C), and at the end of the fourth assembly step according to FIG. 7 in the state according to FIG. 1 (FIG. 11D), FIG. 12 shows a perspective view of a fastening body of an assembly according to a second exemplary embodiment of the present invention, and FIG. 13 shows a perspective view of the assembly according to FIG. 12 with a partially transparent component body in the illustration during the second assembly step.

The figures show two exemplary embodiments of an assembly 1 according to the invention. The assembly 1 has a component body 2 and a fastening body 3 for fastening the component body 2.

The assembly can be any form of assembly. The assembly is preferably an electrically operated assembly. For example, according to a preferred embodiment, the assembly 1 can be a luminaire as shown in the illustrated exemplary embodiments. The component body 2 can then preferably have or be a luminaire housing, as can be seen in particular in FIGS. 1 and 2. The luminaire housing 2 can preferably have a light source. The light source can preferably comprise an LED or an LED module. Furthermore, the luminaire housing 2 can accommodate at least some of the luminaire operating elements, such as a luminaire electrical system and/or a luminaire electronic system, for operating the luminaire 1, such as, for example, corresponding wiring or a luminaire driver and the like, as shown by way of example in FIG. 3.

As can be seen in particular in FIGS. 2-12, the component body 2 can be connected to the fastening body 3 via a bayonet closure 4 of the assembly 1.

The fastening body 3 can preferably have mounting structures 30 for fastening the component body 2 connected to the fastening body 3 via the bayonet closure 4 to a mounting surface M shown schematically, for example, in FIGS. 1 and 11.

The assembly 1 can have at least one of the bayonet closures 4 on two opposite sides. This is particularly advantageous in case of a square (i.e. square or rectangular) assembly 1.

The assembly 1 can have a plurality of the bayonet closures 4 provided along a circle and preferably evenly distributed over this circle, as is the case, for example, in the illustrated exemplary embodiments. In the illustrated exemplary embodiments, three bayonet closures 4 are provided, which are evenly distributed over a circle or over the circumference. This is particularly advantageous for round assemblies 1, as shown in the exemplary embodiments.

Overall, the assembly 1 can thus have one or more of the bayonet closures 4, wherein the plurality of bayonet closures 4 are then preferably provided so as to be symmetrically or evenly distributed.

The bayonet closure 4 has a bayonet projection 5—here, for example, on the component body side. Here, the bayonet projection 5 has a square or angular cross-section as seen in its projection direction, as can be seen by way of example in FIGS. 3, 11 and 13. In principle, other cross-sectional shapes of the bayonet projection 5 are also conceivable, for example, a round cross-section seen in its projection direction. The bayonet projection 5 can preferably be designed as a pin or as a block.

The bayonet closure 4 preferably further comprises a bayonet groove 6—here, for example, on the fastening body side—in and along which the bayonet projection 5 can be guided, as can be seen, for example, in the sequence of steps in FIGS. 11A-11D.

According to a preferred embodiment, as also shown in the exemplary embodiments, the component body 2 can have the bayonet projection 5 and the fastening body 3 can have the bayonet groove 6.

The bayonet groove 6 has an introduction portion 60, via which the bayonet projection can be introduced into the bayonet groove 6 in an introduction direction E, as is indicated, for example, in FIGS. 5 and 13.

The bayonet groove 6 also has a function portion 61 which extends laterally with respect to the introduction direction E away from the introduction portion 60 and opens at a distal end thereof in a locking portion 62 for securing the bayonet projection 5, in which the bayonet projection 5 can be secured in a locking position (cf. FIGS. 1 and 11D).

The function portion 61 tapers toward the locking portion 62, as can be seen in particular in FIGS. 2-5 and 11-13.

The function portion 61 preferably comprises a run-on slope 65 pointing in the introduction direction E and inclined toward the locking portion 62 in the introduction direction E. It preferably comes into contact with the bayonet projection 5 when the bayonet projection 5 is introduced into the function portion 61 toward the locking portion 62 in order to suitably fix the bayonet projection in the locking position.

The component body 2 and the fastening body 3 preferably each have contact faces 21, 31 directed toward one another with respect to the introduction direction E. The bayonet closure 4 is designed such that the contact faces 21, 31 are pressed against one another in the locking position (cf. FIG. 11D), preferably by supporting the bayonet projection 5 against the locking portion 62 or the run-on slope 65.

In a preferred embodiment not shown herein, the assembly 1 can have a seal which is preferably provided or pressed in a circumferentially closed manner between the two contact faces 21, 31 in order to create a seal of the assembly 1 between them in the locking position.

As can be seen in particular in FIGS. 1 and 11D, the assembly 1 can preferably be designed such that the bayonet groove 6 is completely covered in the locking position, preferably by the component body 2 in this case.

As also shown in FIGS. 1 and 11D, the component body 2 can accommodate the fastening body 3 in the locking position, at least partially (as shown herein) or completely.

The bayonet groove 6 further comprises a blocking portion 63 which connects the function portion 61 to the introduction portion 60. The blocking portion 63 can be arranged downstream of the introduction portion 60 in the introduction direction E or, as shown in the illustrated exemplary embodiments, branch off laterally from the introduction portion 60 in order to merge into the function portion 61 (cf., for example, FIGS. 2, 3 and 12). In the exemplary embodiments shown herein, the blocking portion 63 preferably branches off from an end of the introduction portion 60 that is distal with respect to the introduction direction E. The blocking portion 63 can preferably branch off from an end of the introduction portion 60 opposite an introduction opening 66 for the bayonet projection 5 (for introduction) into the bayonet groove 6.

The bayonet groove 6 further comprises a pocket portion 64 extending between the blocking portion 63 and the locking portion 62 away from the function portion 61 in the opposite direction to the introduction direction E, in which the bayonet projection 5 can be at least partially or completely received in a holding position.

The assembly 1 further comprises a blocking element 7 which can be selectively positioned in a blocking position in the blocking portion 63, in order to block a passage 67 for the bayonet projection 5 in the bayonet groove 6 between the introduction portion 60 and the function portion 61.

The assembly 1 is designed such that the blocking portion 63 is at least partially exposed in the holding position in order to position the blocking element 7 in the blocking portion 63, as shown by way of example in FIGS. 6, 9, 11A-11C, 12 and 13. Consequently, introducing the bayonet projection 5 into the pocket portion 64 leads to a relative offset of the component body 2 and the fastening body 3 counter to the introduction direction E, whereby the blocking portion 63 is correspondingly exposed in this holding position for positioning the blocking element 7.

For positioning the blocking element 7 in the blocking position in the blocking portion 63, the blocking element 7 can, for example, be provided or attached, preferably in a releasable manner.

The blocking element 7 can also be provided—for example on the fastening body 3—such as to be movable at least in the holding position (but preferably also in the disassembled state of the assembly 1; e.g. according to FIGS. 2 and 3) optionally between the blocking position (cf. FIGS. 6-8, 11C, 11D, 12 and 13) and a release position (cf. FIGS. 2-5, 9, 10, 11A and 11B), in which the blocking element 7 releases the passage 67 in the bayonet groove 6 between the introduction portion 60 and the function portion 61 for the bayonet projection 5.

The blocking element 7 can, for example, have (cf. FIGS. 12 and 13) or be (cf. FIG. 2-11) a screw 70. In the exemplary embodiment shown here in FIGS. 2-11, the blocking element 7 or the screw 70 is designed as a threaded pin. The screw 70 can then be designed and provided such as to be moved between the blocking position and the release position by a screwing movement of the screw 70, as shown, for example, by the detailed illustrations in FIGS. 4, 6 and 9.

The blocking element 7 or the screw 70 can preferably have a screw engagement profile 73 (for example a slot, a cruciform recess, a hexagon socket (as shown), a hexalobular socket, etc.) for screwing the blocking element 7 into a corresponding thread—here on the side of the fastening body 3—in a simple manner and using common tools W or to move it between the blocking position and the release position (cf., for example, the detailed representations in FIGS. 4, 6 and 9).

According to the second exemplary embodiment shown here in FIGS. 12 and 13, the blocking element 7 can also have, for example, a pressure piece 71 with a movable pressure part 72. The pressure part 72 can preferably be preloaded into the blocking position by a compression spring in order to block the passage 67 in the bayonet groove 6 between the introduction portion 60 and the function portion 61 for the bayonet projection 5, as shown by way of example in FIGS. 12 and 13. The pressure piece 71 can preferably be designed and provided in such a way that the pressure part 72 can be selectively transferred from the blocking position into the release position, counter to the preload of the compression spring. The pressure piece 71 can have an external thread and thus a screw 70 in order to be provided in the installation position according to FIGS. 12 and 13—here, for example, screwed into the fastening body 3 in the region of the blocking portion 63 or passage 67. It is also conceivable for the pressure piece 71 to be received in the assembly 1 in a force-fitting manner (e.g. by self-clamping) in order to be provided in the installation position according to FIGS. 12 and 13—here, for example, introduced or pressed into the fastening body 3 in the region of the blocking portion 63 or passage 67.

The assembly 1 preferably has a square, preferably a quadrangular (for example quadrate or rectangular) basic shape or contour as viewed in the introduction direction E. Alternatively, it is also conceivable for the assembly 1 to have a round, preferably circular, basic shape or contour, as shown in the exemplary embodiments in FIGS. 1-13, when viewed in the insertion direction E. In principle, the present invention is not limited to any particular basic shape or contour of the assembly 1.

A method for assembling or disassembling an assembly 1 according to the invention is described below.

First, the component body 2 and the fastening body 3 are provided.

The fastening body 3 can then optionally be attached to a mounting surface M. For this purpose, for example, screws M1 can be screwed through the mounting structures 30 and into the mounting surface M (cf., for example, FIG. 4).

The blocking element 7 can then be moved into the release position in order to release the passage 67 in the bayonet groove 6 between the introduction portion 60 and the function portion 61 for the bayonet projection 5, as shown by way of example in the detailed illustration in FIG. 4. The blocking element 7, designed here as a threaded pin, can be moved by means of a tool W, i.e. screwed into the fastening body 3.

The bayonet projection 5 is then introduced into the bayonet groove 6 via its introduction portion 60 in the introduction direction E (cf. FIGS. 5 and 13). In order to position the component body 2 relative to the fastening body 3 in a simple manner before joining them, the two components can each have a positioning marking 22, 32 which indicates to the installer a correct relative positioning of these components 2, 3. (cf. arrow 1 in FIG. 5).

The bayonet projection 5 is thus introduced into the bayonet groove 6 in the introduction direction E and is then introduced from the introduction portion 60 via the now exposed passage in the blocking portion 63 into the function portion 61, as shown by the arrow 2 in FIG. 5. There, the bayonet projection 5 is introduced or hooked into the pocket portion 64 counter to the introduction direction E and thus reaches the holding position. Due to the relative movement thus generated between the component body 2 and the fastening body 3 counter to the introduction direction E, the blocking portion 63 is exposed accordingly in the holding position, as shown in FIGS. 6, 11A and 11B.

The blocking element 7 is then positioned in the blocking portion 63 in the blocking position in order to block the passage 67 for the bayonet projection 5 in the bayonet groove 6 between the introduction portion 60 and the function portion 61. To position the blocking element 7 in the blocking position, the threaded pin 70 is preferably moved or screwed from the release position into the blocking position by means of a tool W, as shown by way of example in the detailed illustration in FIG. 6 and in FIG. 11C. The bayonet projection 5 is thus secured in the bayonet groove 6.

In the exemplary embodiment in FIGS. 12 and 13, the pressure part 72 is preferably moved into the release position by means of the bayonet projection 5 when the bayonet projection 5 is passed through the blocking portion 63, thus allowing the bayonet projection to pass through the passage 67. After passing, the pressure part 72 is moved back into the blocking position by its preload. The bayonet projection 5 is thus secured in the bayonet groove 6.

Finally, the bayonet projection 5 in the function portion 61 is guided out of the pocket portion 64 and then laterally into the locking portion 62, where the bayonet projection 5 is fixed in the locking position (cf. FIGS. 1 and 10D). This is also represented by way of example by the arrow in FIG. 7. In this way, the component body 2 and the fastening body 3 are securely connected to one another by means of the bayonet closure 4. In the locking position, a seal (not shown here) can preferably be clamped between the contact faces 21, 31.

Disassembly of assembly 1 is basically carried out in reverse order of the steps previously described for assembly. This is shown by way of example in FIGS. 8 and 10.

The bayonet projection 5 is hence guided into the pocket portion 64 (cf. FIG. 8) in order to correspondingly expose the blocking portion 63. The blocking element 7 is then removed from the passage 67, here by means of the tool W, by screwing the threaded pin 70 into the fastening body 3, i.e. into the release position (cf. FIG. 9). The bayonet projection 5 is then guided out of the pocket portion 64 via the thus exposed blocking portion 63 and the introduction portion 60 from the bayonet groove 6 (cf. the arrow in FIG. 10).

The present invention is not limited by the exemplary embodiments described above, insofar as it is covered by the subject-matter of the following claims.

What is claimed is:

1. An assembly (1) comprising:
    a component body (2); and
    a fastening body (3) for fastening the component body (2);
    wherein the component body (2) is connectable to the fastening body (3) via a bayonet closure (4) of the assembly (1);
    wherein the bayonet closure (4) comprises:
        a bayonet projection (5); and
        a bayonet groove (6), the bayonet projection (5) being guided in and along the bayonet groove (6);
    wherein the bayonet groove (6) comprises:
        an introduction portion (60), the bayonet projection (5) being introducible into the bayonet groove (6) in an introduction direction (E) via the introduction portion (60);
        a function portion (61) extending laterally with respect to the introduction direction (E) away from the introduction portion (60) and opening at a distal end thereof in a locking portion (62) for securing the bayonet projection (5) in a locking position;
        a blocking portion (63) connecting the function portion (61) to the introduction portion (60); and
        a pocket portion (64) extending between the blocking portion (63) and the locking portion (62) away from the function portion (61) counter to the introduction direction (E), the bayonet projection (5) being at least partially receivable in the pocket portion (64) in a holding position;
    wherein the assembly (1) further comprises a blocking element (7) selectively positionable in a blocking position in the blocking portion (63) in order to block a passage for the bayonet projection (5) in the bayonet groove (6) between the insertion portion (60) and the functional portion (61); and
    wherein the assembly (1) is configured such that the blocking portion (63) is at least partially exposed in the holding position so as to position the blocking element (7) in the blocking portion (63);
    wherein the assembly (1) is a luminaire, and the component body (2) comprises or is a luminaire housing;
    wherein the luminaire housing comprises a light source.

2. The assembly (1) according to claim 1, wherein the component body (2) comprises the bayonet projection (5) and wherein the fastening body (3) comprises the bayonet groove (6).

3. The assembly (1) according to claim 1, wherein in the holding position, the blocking element (7) is movable selectively between the blocking position and a release position, wherein the blocking element (7) in the release position releases the passage for the bayonet projection (5) in the bayonet groove (6) between the insertion portion (60) and the functional portion (61).

4. The assembly (1) according to claim 3, wherein the blocking element (7) comprises or is a screw (70).

5. The assembly (1) according to claim 4, wherein the screw is movable between the blocking position and the release position by a screwing movement of the screw.

6. The assembly (1) according to claim 3, wherein the blocking element (7) has a pressure piece (71) with a movable pressure part (72), wherein the pressure part (72) is preloaded into the blocking position by a compression spring in order to block the passage for the bayonet projection (5) in the bayonet groove (6) between the introduction portion (60) and the function portion (61).

7. The assembly (1) according to claim 6, wherein the pressure piece (71) is configured such that the pressure part (72) is selectively transferrable from the blocking position into the release position counter to the preload of the compression spring.

8. The assembly (1) according to claim 1, wherein the component body (2) at least partially or completely receives the fastening body (3) in the locking position.

9. The assembly (1) according to claim 1, wherein the bayonet groove (6) is completely covered in the locking position.

10. The assembly (1) according to claim 1, wherein the blocking portion (63) is configured according to a first option or a second option, or both, wherein:
    in the first option, the blocking portion (63) branches off from an end of the insertion portion (60) that is opposite an insertion opening (66) for the bayonet projection (5) into the bayonet groove (6); and
    in the second option, the blocking portion (63) branches off from an end of the introduction portion (60) that is distal with respect to the introduction direction (E).

11. The assembly (1) according to claim 1, wherein the function portion (61) tapers toward the locking portion (62).

12. The assembly (1) according to claim 1, wherein the function portion (61) comprises a run-on slope (65) pointing in the introduction direction (E) and inclined toward the locking portion (62) in the introduction direction (E).

13. The assembly (1) according to claim 1, wherein the component body (2) and the fastening body (3) each have contact faces (21, 31) directed toward one another with respect to the introduction direction (E), wherein the bayonet closure (4) is configured such that the contact faces (21, 31) are pressed against one another in the locking position.

14. The assembly (1) according to claim 1, wherein the bayonet projection (5) has a round or angular cross-section, when viewed in its projection direction.

15. The assembly (1) according to claim 1, further comprising a plurality of respective bayonet closures, wherein the plurality of respective bayonet closures includes the bayonet closure (4).

16. The assembly (1) according to claim 1, wherein a basic shape or contour of the assembly (1) is angular or round when viewed in the insertion direction (E).

17. The assembly (1) according to claim 15, wherein the assembly (1) is further configured according to a first option or a second option, or both, wherein:
    in the first option, at least one bayonet closure in the plurality of respective bayonet closures is positioned on each of two opposite sides of the assembly (1); and
    in the second option, the plurality of respective bayonet closures is distributed along a circle.

18. The assembly (1) according to claim 1, wherein the fastening body (3) comprises mounting structures (30) for fastening the component body (2) connected thereto via the bayonet closure (4) to a mounting surface (M).

* * * * *